United States Patent Office 3,480,724
Patented Nov. 25, 1969

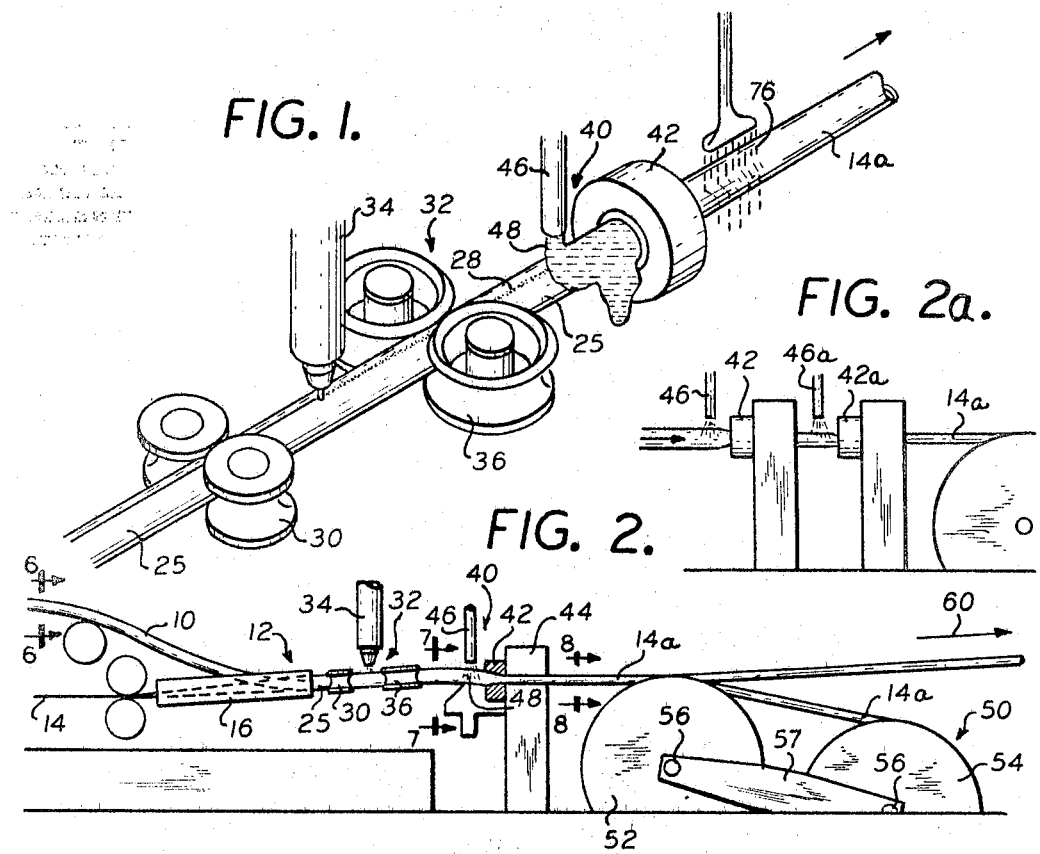

3,480,724
COAXIAL CABLE WITH WELDED METAL SHEATH
Oscar G. Garner, Riverside, Conn., assignor to General Cable Corporation, New York, N.Y., a corporation of New Jersey
Original application Dec. 30, 1965, Ser. No. 517,706. Divided and this application July 18, 1968, Ser. No. 745,931
Int. Cl. H01b 7/18
U.S. Cl. 174—102                                            7 Claims

ABSTRACT OF THE DISCLOSURE

This coaxial cable has a center conductor and has electrical insulation bonded to the conductor. A welded metal sheath surrounds the insulation and exerts some pressure on the insulation uniformly around the circumference of the cable. The insulation is preferably foam and the cable is made with the radial thickness of the foam substantially equal all around its circumference so that the electrical qualities of the cable are uniform around the circumference.

RELATED PATENT APPLICATION

This application is a division of application Ser. No. 517,706; filed Dec. 30, 1965, now U.S. Patent No. 3,430,330. The parent case claims a method, and the present application relates to the product made by the method.

BACKGROUND AND SUMMARY OF THE INVENTION

This invention provides a metal-sheathed coaxial cable of greater mechanical strength and of more uniform electrical properties along its length than comparable cables of the prior art.

Coaxial cables have a conductor core surrounded by electrical insulation, and the insulation is enclosed in a conducting sheath. Cables have been made by forming the sheath around the insulated core and welding the sheath progressively, but this is difficult without damaging the insulation. When the sheath has been formed and welded as a tube of substantially larger diameter than the insulation on the conductor core, so as to keep the welding operation spaced from the insulation subsequent reduction of the sheath diameter presented serious problems.

This invention provides a cable in which the sheath is formed and welded as a tube of larger diameter than the insulation, and in which the sheath is then drawn down in a stationary sizing die with a short distance between the region of welding and the sheath diameter reduction so that there is a minimum distance in which the core moves at a faster rate than the sheath in which the core is enclosed. This eliminates friction between the sheath and insulation which would affect the uniformity of the properties of the insulation.

The drawdown of this invention uses a sizing die and allows for control of the mechanical properties of the sheath to get higher strength; and it also provides for accurate control of the squeeze of the insulation by the sheath, a very important consideration in the electrical properties of the insulation, especially when foam insulation is used.

The cable of this invention has the insulation of substantially uniform radial thickness around its circumference; first because it is protected from the welding heat, and second because it is protected from wear by the short run of core enclosed in the sheath while travelling faster than the sheath. The accurate insulation dimensions and the control of squeeze give the cable a minimum SRL (structural return loss) of 26 db for a frequency range of 8 to 220 megacycles.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views:

FIGURE 1 is a diagrammatic, isometric view showing a portion of the method and apparatus of this invention;

FIGURE 2 is a diagrammatic side elevation showing the apparatus of FIGURE 1 and also showing the forming of the sheath and the manner in which the sheath is pulled to advance it through the sizing die;

FIGURE 2a is a fragmentary view showing a modification of FIGURE 2;

FIGURE 3 is a top plan view of the apparatus shown in FIGURE 2;

FIGURE 4 is a fragmentary view, similar to a portion of the structure shown in FIGURE 2, but showing a modified construction of the apparatus for pulling the cable;

FIGURE 5 is a top plan view of the apparatus shown in FIGURE 4; and

FIGURES 6, 7 and 8 are greatly enlarged sectional views taken on the lines 6—6, 7—7 and 8—8, respectively, of FIGURE 2.

DESCRIPTION OF PREFERRED EMBODIMENT

An insulated conductor core 10 is fed to a forming station 12 where a flat metal sheathing 14 is progressively formed into a tube around the conductor core 10. This forming of the metal sheath 14 is done in a forming die 16 which is merely representative of means for bending a flat strip into a tube with a longitudinal seam.

The conductor core 10 has a center conductor 20 (FIGURE 6) surrounded by electrical insulation 22. This electrical insulation is preferably a plastic foam such as polyethylene having a percent of air of about 45 to 55. These values are given by way of illustration. For a particular cable, the plastic foam is kept substantially uniform along the entire length of the cable since variations in the density of the foam, or other physical characteristics, affect the electrical characteristics of the cable.

The radial thickness of the insulation 22 depends upon the diameter of the conductor 20 and is preferably at least one and one-half times as great as the diameter of the conductor. The radial thickness of the insulation 22 is preferably within a tolerance of 0.002 inch, throughout the length of the cable, for conductor cores of less than one half inch in diameter, and the tolerance is somewhat greater for larger diameters.

The cable consisting of the conductor core 10, surrounded by the formed metal sheath 14, is indicated by the reference character 25. The formed sheath or tube, designated as 14', in FIGURE 7, is of substantially larger diameter than the conductor core 10. The tube 14' has a longitudinal seam 28 which is spaced from the insulation of the conductor core 10, so that the seam can be welded without damage to the insulation of the conductor core.

Beyond the forming die 16, the cable 25 travels through a roll stand 30 at a welding station 32. There is a torch 34 at the welding station in position to weld the seam 28 as the cable 25 travels from the roll stand 30 to another roll stand 36, spaced closely behind the roll stand 30 at the welding station 32.

Close behind the roll stand 36, there is a sizing station 40 which includes a bell or sizing die 42, carried by a supporting frame 44, and there is a pipe 46 immediately in front of the bell or sizing die 42 for pouring a lubricant 48 (best shown in FIGURE 1) over the ouside of the cable sheath 14'.

The sizing and sinking is done by a single stationary die 42 or by multiple dies. The die or dies are detachable from the supporting frame 44 so that dies of other size can be substituted when operating with different sizes of cables or when a different degree of drawdown is desired for a cable of the same size.

The sizing station 40 is located close to the forming station 12 and welding station 32 so that the same attendant can inspect both the welding and the sizing operations. This distance is preferably not greater than about 8 feet. The die is about 2 to 4 feet beyond the torch 34.

Another advantage of the close proximity of the welding and sizing stations is that the roll stand 36 at the welding station, in addition to positioning the cable accurately for welding, serves also as a pair of damping rolls to minimize the effect of any movement of the cable 25 as it enters the sizing die 42. This obtains more uniform production, especially since slight movements of the order of 0.005 to 0.010 inch at the welding point, seriously affect the quality of the weld.

Another important advantage of having the forming and welding station close to the sizing station is that the conductor core 10 moves faster than the tube 14' before the tube has passed through the sizing die 42. This is because the conductor core 10 advances at the same speed as the reduced-diameter portion of the tube beyond the sizing die, and because of the elongation of the tube in the sizing die 42, the lineal speed of the tube ahead of the sizing die is less than that beyond the sizing die. The tube beyond the sizing die 42 is indicated by the reference character 14a.

At regions where the conductor core 10 and the sheath tube 14' move at different speeds, there is friction between contacting surfaces of the conductor core 10 and the sheath tube 14'. This friction contact is against certain areas of the conductor core and not against the upper areas where there is clearance between the conductor core and the tube. It is, therefore, desirable to reduce to a minimum the travel of the conductor core 10 while in contact with the tube and moving at a different speed from the tube so as to avoid wear, and especially uneven wear, of the insulation.

As the tube or sheath 14' is drawn down tight around the conductor core, the friction increases and it is desirable to have this operation done in as short a length as possible so that the core and sheath can be brought to the same speed promptly where relative movement no longer occurs. This makes the use of the stationary sizing die 42 advantageous because such dies effect a drawdown in a short tube length.

The reduction in the diameter of the tube or sheath 14' in the sizing die 42 is preferably between about 5% to 40%; the amount of reduction depending upon the original width of the metal sheath 14 as compared to the circumference of the conductor core 10. It is desirable that the tube 14' be reduced sufficiently to contact the conductor core 10 around the entire circumference of the core and it is preferable that the sheath impart some squeeze to the insulation on the conductor core. The reduction of the tube or sheath 14' in the sizing die is preferably a cold working of the metal so that the operation improves the mechanical properties of the sheath by imparting to it a higher strength. The preferred material for the sheath is aluminum, but other metals can be used. Copper is a suitable substitute for the aluminum, but adds somewhat to the cost and weight.

The wall thickness of the metal sheath is not reduced by its passage through the sizing die 42 and the effect of the die is merely to lengthen the tube as the diameter reduces. This is a "sinking" operation as differentiated from a "drawing" process which would reduce the sheath thickness as well as its size. It is, of course, necessary to use metal strip of a composition and temper which will elongate in the die 42 in the manner required by the method of this invention.

Starting with fully annealed aluminum of the electrical conductive grade, the working in the die 42 results in a harder tube; up to medium or half hard depending upon the diameter reduction.

The effect of squeeze of the insulation 22 by the drawn down sheath of the cable 14a on the electrical properties of the insulation, is critical. Excessively squeezed cores produce poor SRL (structural return loss) values which drop sharply with increase in squeezing. The squeeze for a core of approximately one half inch in diameter, with a .098 inch conductor, should not be above about 15 mils. The squeeze also affects the impedance value, higher squeezing resulting in lower impedance and a lighter squeeze resulting in higher impedance. To obtain the desired electrical properties, therefore, the cable core must be properly designed in accordance with the intended reduction in diameter of the sheath after welding and with a range of squeeze between about 5 and 15 mils. Maximum SRL is 26 db and preferably about 32 db for 8 to 220 megacycles.

A more highly squeezed core requires more force to pull or slip the sheath over the core. With this invention, a pull of seventy pounds per 6 inches of the core to move it axially with respect to the sheath in the final cable, the test being made by cutting back a portion of the sheath, indicates a desirable degree of squeeze with a core diameter of about one half inch. For other cable sizes, the force is directly proportional to the core diameter. The insulation sticks to the center conductor and does not pull away from it as the result of sudden changes in outer temperature.

FIGURES 2 and 3 show a capstan 50 for pulling the cable 14a with sufficient force to advance the welded sheath continuously through the sizing die 42 at uniform speed.

The capstan 50 includes two drums 52 and 54, mounted for rotation about parallel axles 56 carried by a fixed frame 57. The drums 52 and 54 preferably have suitable grooves for receiving the cable 14a, and the drums 52 and 54 are driven by power with any conventional capstan drive. A pull is exerted on the cable 14a, where it comes off the capstan, as indicated by the arrow 60, so as to keep the convolutions of the cable 14a tight on the drums and because of the substantial length of the cable on the drums 52 and 54 and the angular wrap of the cable around the drums, a substantial friction is developed which advances the cable with uniform speed and without slippage on the drums 52 and 54, even though the outside of the cable remains coated with lubricant from the lubricant supply pipe 46.

FIGURES 4 and 5 show a different construction of the apparatus for pulling the sheath tube through the sizing die 42. Instead of the drum capstan, the apparatus illustrated in FIGURES 4 and 5 uses a caterpillar capstan 64. This includes an upper endless belt 66 which passes around wheels 67 and 68, driven by power and located in such position that the lower run of the belt 66, which is moving in the direction of the arrow 70, contacts with the cable 14a.

The caterpillar capstan 64 includes a similar endless belt 66' which runs on wheels 67' and 68' driven by power and located in position to have the upper run of the belt 66' contact with the cable 14a to move it in the direction of the arrow 70'.

The belts 66 and 66' are pressed against the cable 14a with sufficient force to develop substantial friction but because of the reduced area of contact and the lack of snubbing effect as compared with the round or drum capstan 50, the caterpillar capstan 64 does not have as much friction and it is desirable to remove any lubricant from the cable 14a before gripping it with the capstan 64.

In order to remove the lubricant 48 from the cable 14a, there is a spray nozzle 74 located just beyond the die 42 in position to direct a plurality of liquid streams 76, best shown in FIGURE 1, against the cable 14a. These liquid streams 76 are sufficient in number and are of enough force to wash off the lubricant 48 around the entire circumference of the cable 14a. Strong water streams can be used, or streams of liquid having some solvent action can be substituted, if desired.

The preferred embodiments of the invention have been illustrated and described, but changes and modifications can be made and some features can be used in different combinations without departing from the invention as defined in the claims.

What is claimed is:

1. A coaxial cable including a center conductor, a layer of electrical insulation surrounding the conductor and bonded to the conductor to form a core of the cable, and a uniform inside diameter metal sheath surrounding the core and comprising a tube having a welded longitudinal seam, having been reduced in diameter to squeeze the insulation of the core and having a minimum SRL (structural return loss) of 26 db for a frequency range of 8 to 220 megacycles.

2. The coaxial cable described in claim 1 characterized by the welded seam being a butt weld with a smooth inside wall for maintaining uniform pressure on the insulation around the entire circumference thereof.

3. The coaxial cable described in claim 1 characterized by the sheath being aluminum of the electrical conductive grade and of a hardness from medium to half hard.

4. The coaxial cable described in claim 1 characterized by the center conductor being copper and the insulation being foamed polyethylene approximately 45 to 55% air and of a radial thickness at least 1½ times the diameter of the center conductor, the sheath being aluminum, and being of the electrical conductive grade and medium hard.

5. A coaxial cable comprising a conductor with a layer of foam insulation bonded to the core, a metal sheath holding the foam under compression, the sheath being of uniform diameter along its length for obtaining uniform pressure on the foam throughout its length, the sheath having a welded seam extending longitudinally, the sheath at the weld having a smooth inside surface, having been reduced in diameter to obtain uniform pressure on the foam throughout its circumferential extent.

6. The coaxial cable described in claim 5 characterized by the squeeze of the foam insulation being between about 5 and 15 mils.

7. The coaxial cable described in claim 6 characterized by the foam being polyethylene.

References Cited

UNITED STATES PATENTS

| | | | |
|---|---|---|---|
| 1,227,346 | 5/1917 | Trood et al. | 174—102 |
| 2,251,826 | 8/1941 | Fogg. | |
| 2,808,492 | 10/1957 | Yohe | 338—214 X |
| 3,144,369 | 8/1964 | Foord et al. | 156—51 |
| 3,394,400 | 7/1968 | Lamons | 174—102 |

FOREIGN PATENTS

| | | |
|---|---|---|
| 1,299,119 | 6/1962 | France. |
| 1,011,727 | 6/1952 | France. |
| 449,986 | 7/1948 | Canada. |
| 533,341 | 9/1955 | Italy. |
| 509,324 | 7/1939 | Great Britain. |

OTHER REFERENCES

A.P.C. Application of Schmitt et al., Ser. No. 193,918 published May 18, 1943.

LEWIS H. MYERS, Primary Examiner

A. T. GRIMLEY, Assistant Examiner

U.S. Cl. X.R.

174—107, 110